(12) United States Patent
Son et al.

(10) Patent No.: US 8,720,979 B2
(45) Date of Patent: May 13, 2014

(54) 2-DOOR/3-DOOR TYPE VEHICLE HAVING REINFORCEMENT MEMBER AGAINST SIDE IMPACT

(71) Applicant: Hyundai Motor Company, Seoul (KR)

(72) Inventors: Kyunghoon Son, Hwaseong-si (KR); Jaechul Bang, Hwaseong-si (KR); Seungtae Song, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/679,837

(22) Filed: Nov. 16, 2012

(65) Prior Publication Data
US 2014/0054929 A1     Feb. 27, 2014

(30) Foreign Application Priority Data

Aug. 22, 2012   (KR) .................. 10-2012-0091582

(51) Int. Cl.
*B62D 25/04*  (2006.01)
(52) U.S. Cl.
USPC ..................................... 296/193.06
(58) Field of Classification Search
USPC .............. 296/187.12, 193.05, 203.03, 30, 296/187.11, 203.04, 209, 193.06
See application file for complete search history.

(56) References Cited

U.S. PATENT DOCUMENTS

| 6,179,370 | B1 * | 1/2001 | Takeuchi ................ 296/187.12 |
| 7,594,691 | B2 * | 9/2009 | Koormann et al. ...... 296/187.12 |
| 2009/0289475 | A1 * | 11/2009 | Walter et al. ............. 296/203.01 |

FOREIGN PATENT DOCUMENTS

| JP | 5-77767 A | 3/1993 |
| JP | 2005-1555 A | 1/2005 |
| KR | 2000-0006742 U | 4/2000 |
| KR | 10-2012-0019738 A | 3/2012 |

* cited by examiner

*Primary Examiner* — Joseph D. Pape
*Assistant Examiner* — Dana Ivey
(74) *Attorney, Agent, or Firm* — Morgan, Lewis & Bockius LLP

(57) ABSTRACT

A 2-door or 3-door type vehicle having enhanced resistance against a side impact may comprise a reinforcement member that is configured to be inclinedly mounted at a side of the 2-door or 3-door type vehicle which is not equipped with a rear door for affixing the reinforcement member. The reinforcement member may be affixed to a center pillar and a side sill at respective opposite ends thereof. The reinforcement member may be affixed to a bulkhead which connects a side sill outer reinforce and a side sill inner reinforce of the side sill.

3 Claims, 6 Drawing Sheets

ID_DOOR/3-DOOR TYPE VEHICLE HAVING
REINFORCEMENT MEMBER AGAINST SIDE
IMPACT

CROSS-REFERENCE TO RELATED APPLICATIONS

The present application claims priority of Korean Patent Application Number 10-2012-0091582, filed on Aug. 22, 2012, the entire contents of which application is incorporated herein for all purposes by this reference.

BACKGROUND OF INVENTION

1. Field of Invention

The present application relates to a 2-door or 3-door type vehicle having a reinforcement member against a side impact capable of achieving an improvement in impact strength of the side of the vehicle; and, particularly, to a 2-door or 3-door type vehicle having a reinforcement member against a side impact in which a reinforcement member for resisting an impact due to a side collision is provided in the 2-door or 3-door type vehicle which is not equipped with a rear door and has poor side impact strength.

2. Description of Related Art

A conventional passenger vehicle is equipped with four doors so that passengers easily can get on and off. In such a 4-door type vehicle, as shown in FIG. 1, impact beams 15 are installed within a door 14 so that impact energy due to the side collision of the vehicle is not transferred to passengers, thereby reducing injuries to the passengers caused by the side collision.

However, a rear door is not installed in a 2-door type vehicle such as a coupe, or is installed at only one side of a 3-door type vehicle which has an asymmetrical structure. In the 2-door or 3-door type vehicle, there is a need to install a member for resisting impact energy due to a collision with the side of the vehicle which is not equipped with the door.

As shown in FIG. 2, the 2-door or 3-door type vehicle has a side structure of forming the side, which is not equipped with the door, as a center pillar 11, a side sill 12, and a rear floor side member 13, and has a structure of including a connection member 16 which connects the center pillar 11 and a quarter pillar in order to prevent the center pillar 11 from being pushed backward at the time of a front collision of the vehicle. There is a problem, however, in that passengers would be seriously injured during the side collision because the vehicle does not have a member such as an impact beam to prevent the impact energy from being transferred to the pelvis parts of the passengers at the time of the side collision.

In order to measure an injury value at the time of the side collision, a side collision test is performed in which a dummy D is mounted in the vehicle, the side of the vehicle is struck by a heavy weight body B, and an impulse applied to the head and pelvis of the dummy D is measured. In this case, the impact applied to the head of the dummy D may be reduced through a curtain airbag installed in the vehicle, whereas the impact energy due to the side collision is transferred to the dummy D because the vehicle does not have a member to absorb or resist the impact applied to the pelvis of the dummy D. This means that passengers will be practically injured in the 2-door or 3-door type vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present application are directed to provide a 2-door or 3-door type vehicle having a reinforcement member against a side impact. The reinforcement member is formed in the 2-door or 3-door type vehicle which is not equipped with a rear door in order to resist an impact generated at the time of a side collision at the rear of the vehicle.

Other features and advantages of the present invention can be understood by the following description, and become apparent with reference to the embodiments of the present invention. Also, it is obvious to those skilled in the art to which the present invention pertains that the features and advantages of the present invention can be realized by the means as claimed and combinations thereof.

In accordance with various aspects of the present application, a 2-door or 3-door type vehicle having enhanced resistance against a side impact may comprise a reinforcement member that is configured to be inclinedly mounted at a side of the 2-door or 3-door type vehicle which is not equipped with a rear door for affixing the reinforcement member. The reinforcement member may be affixed to a center pillar and a side sill at respective opposite ends thereof.

The reinforcement member may have a front end, which is located frontward of the vehicle and is affixed to a center pillar outer reinforce of the center pillar. The reinforcement member may have a rear end, which is located rearward of the vehicle and is affixed to a side sill outer reinforce of the side sill.

The reinforcement member may be affixed to a bulkhead which connects the side sill outer reinforce and a side sill inner reinforce. The bulkhead may include a body and one or more lower flanges. The one or more lower flanges may extend from the body and be respectively affixed to side surfaces of the side sill outer reinforce. The rear end of the reinforcement member may be affixed to the body or the one or more lower flanges.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
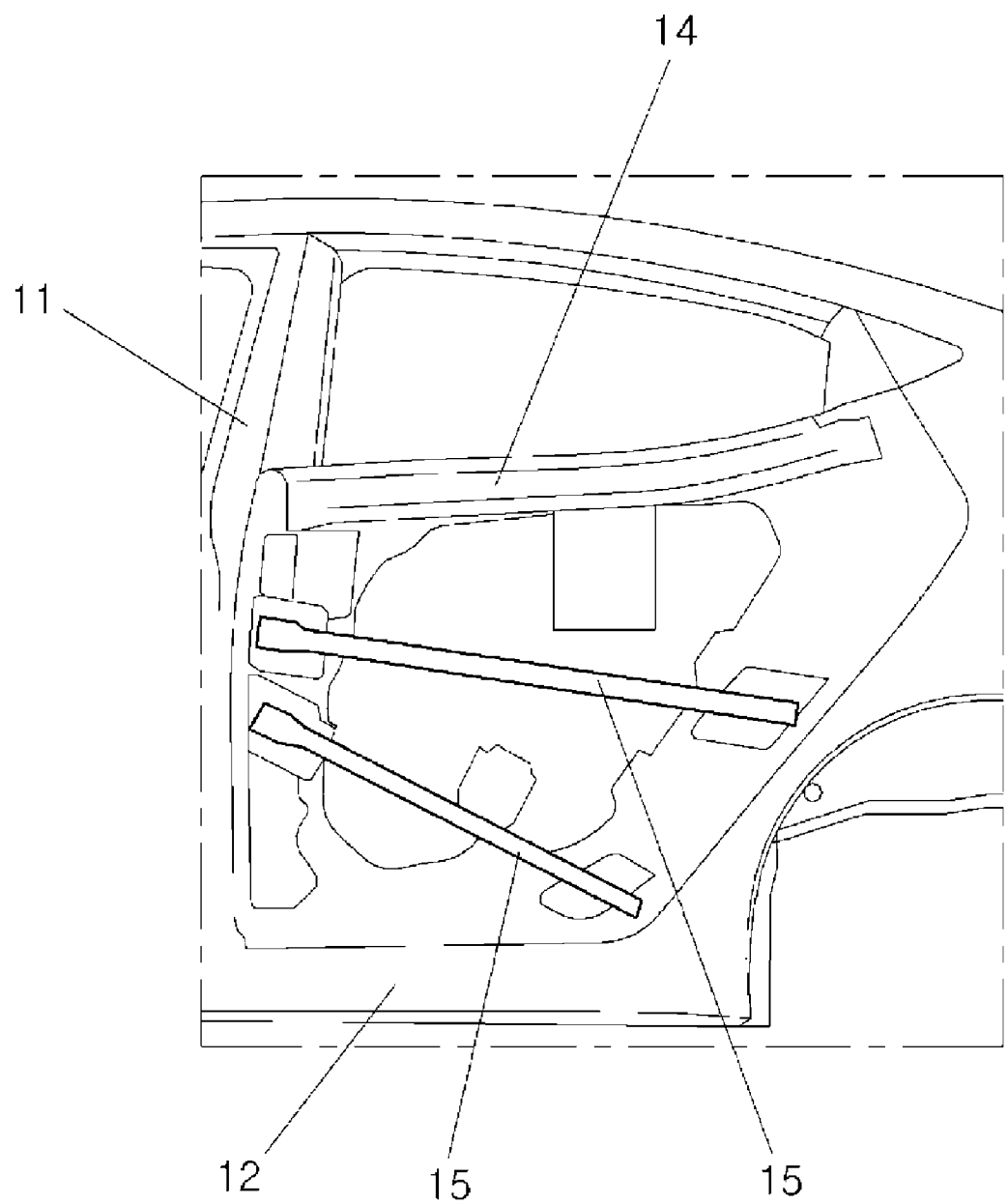
FIG. 1 is a front view illustrating impact beams in a rear door of a conventional 4-door type vehicle.
Figure 2:
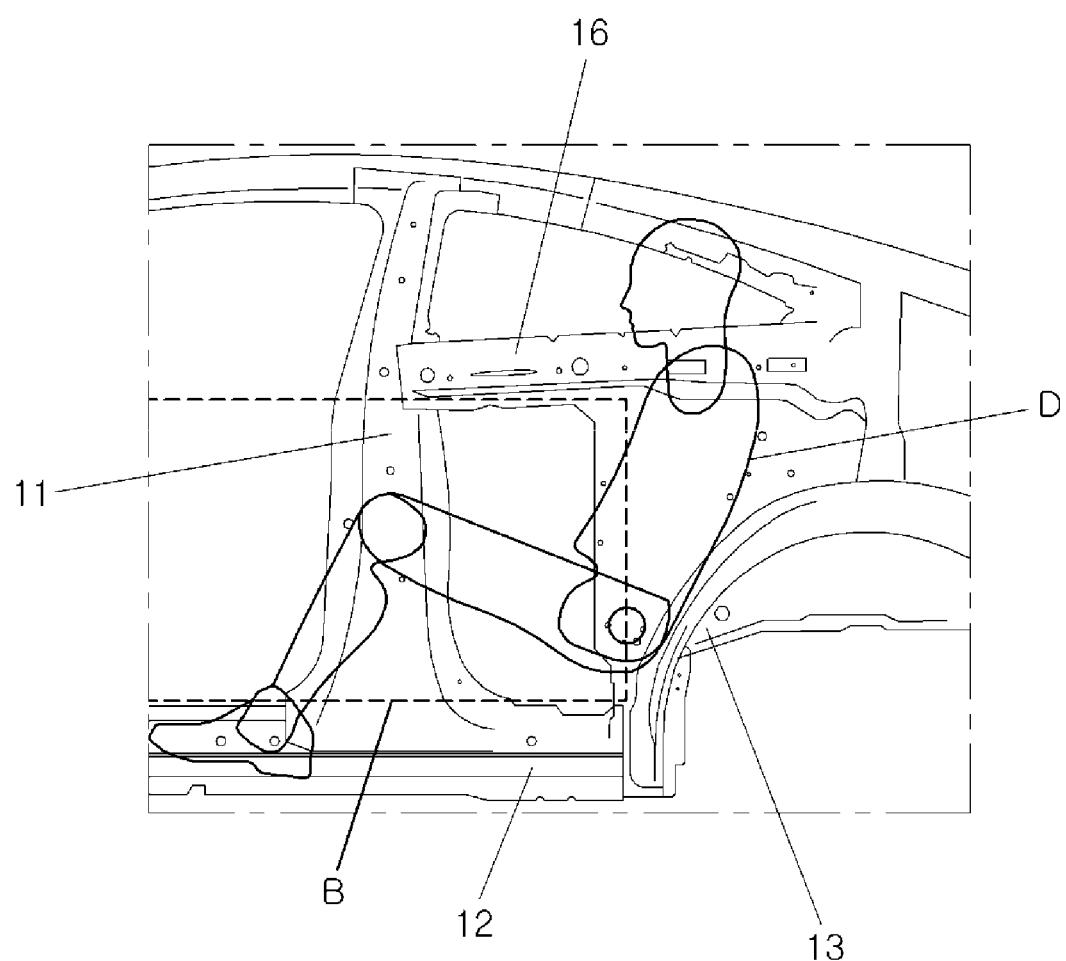
FIG. 2 is a front view illustrating a body structure of a rear side in a 2-door or 3-door type vehicle in accordance with the related art.
Figure 3:
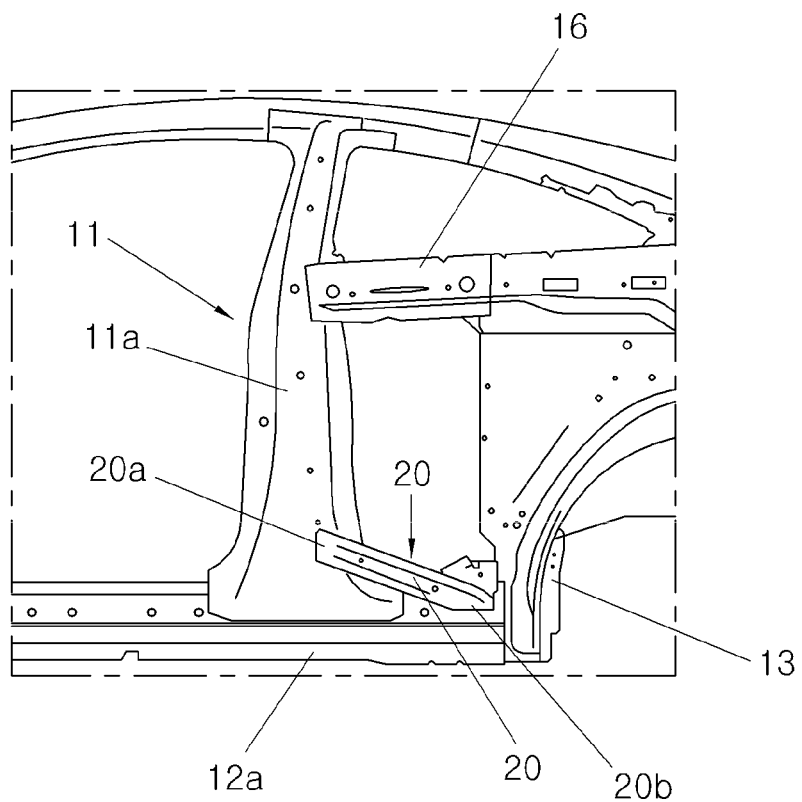
FIG. 3 is a front view illustrating an exemplary reinforcement member in a 2-door or 3-door type vehicle to reduce a side impact in accordance to the present application.

As shown in FIG. 3, a 2-door or 3-door type vehicle having enhanced resistance against a side impact in accordance to the present application includes a reinforcement member installed or mounted at a side of the vehicle which is not equipped with a rear door. The reinforcement member may be inclindly or slantly mounted at the side of the vehicle.

In various embodiments, the reinforcement member 20 is affixed, at respective opposite ends thereof, to a center pillar 11 and a side sill 12 of the vehicle so as to connect the center pillar 11 and the side sill 12. The reinforcement member 20 is affixed to be inclined so as to have a high front end 20a which is located frontward of the vehicle and is connected to the center pillar 11 and to have a low rear end 20b which is located rearward of the vehicle and is connected to the side sill 12.

Figure 4:
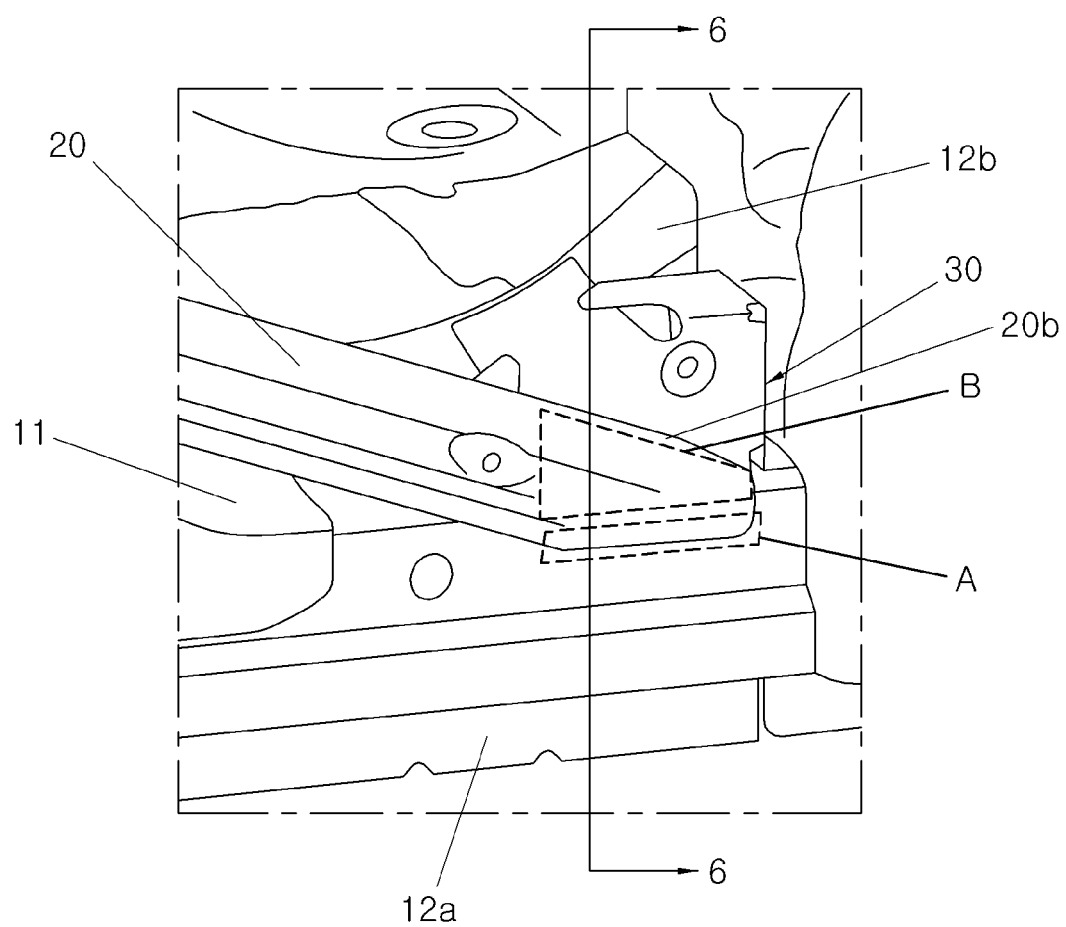
FIG. 4 is an enlarged perspective view illustrating a portion of an exemplary reinforcement member affixed to a side sill in the 2-door or 3-door type vehicle for reducing a side impact in accordance to the present application.

Particularly, the reinforcement member 20 may be connected to a center pillar outer reinforce 11a and a side sill outer reinforce 12a in order to have strength against an impact transferred from the outside during a side collision of the vehicle. In this case, as shown in FIG. 4, a portion in which the reinforcement member 20 is connected to the side sill 12 may be affixed to a bulkhead 30 which is installed to connect the side sill outer reinforce 12a and a side sill inner reinforce 12b.

Figure 5:
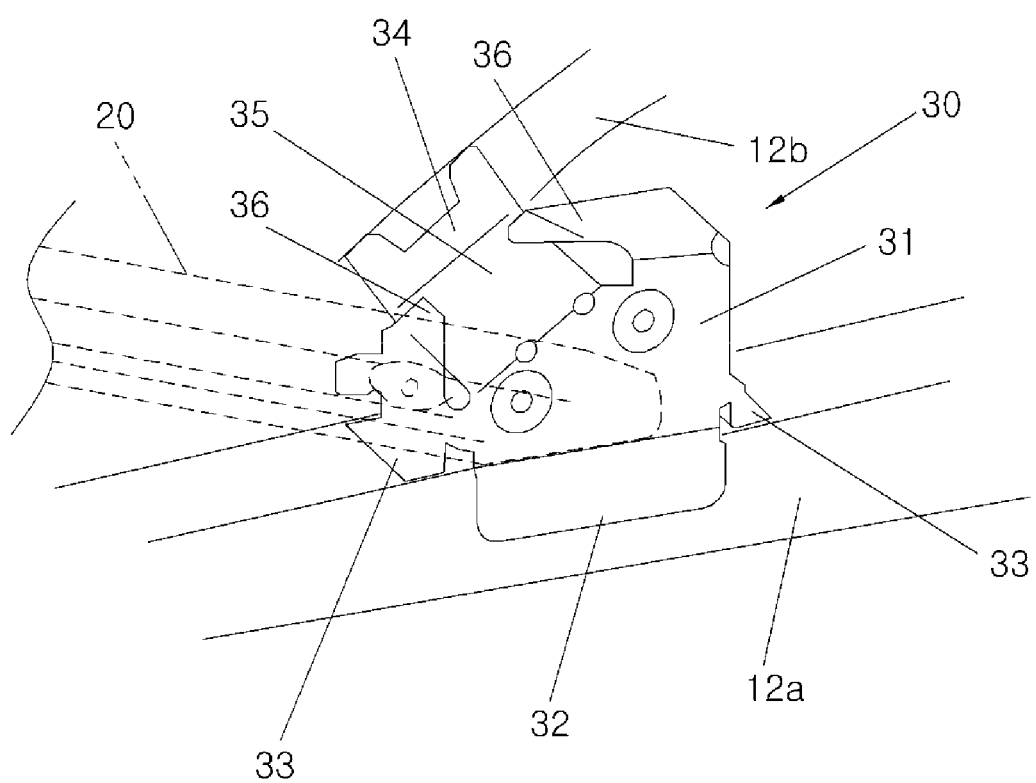
FIG. 5 is a perspective view illustrating an exemplary bulkhead for affixing an exemplary reinforcement member to the side sill in the 2-door or 3-door type vehicle for reducing a side impact in accordance to the present application.

The bulkhead 30 is a member for increasing the strength by connecting the side sill outer reinforce 12a and the side sill inner reinforce 12b which compose the side sill 12, as shown in FIG. 5. The rear end of the reinforcement 20 may be connected to the bulkhead 30 or the side sill outer reinforce 12a.

Referring to FIG. 5, the bulkhead 30 includes one or more lower flanges 32 and one or more side flanges 33 which extend downwards from a body 31 and are respectively affixed to side surfaces and an upper surface of the side sill outer reinforce 12a. The bulkhead 30 may also include an upper flange 35 which is bent at a slanted surface 34 bent from the body 31 and is affixed to the side sill inner reinforce 12b, and include one or more support portions 36 which extend from upper ends of the body 31 and are connected to the slanted surface 34, respectively, thereby supporting the slanted surface 34.

As described above, in various embodiments, the rear end of the reinforcement member 20 is affixed to the bulkhead 30 which is installed to connect the side sill outer reinforce 12a and the side sill inner reinforce 12b. However, since the side sill outer reinforce 12a has the narrow side surface, the reinforcement member 20 is affixed, at a portion thereof, to a portion where the side sill outer reinforce 12a is overlapped with the associated part of the lower flanges 32 (see portion "A" in FIGS. 4 and 6). In addition, the other portion of the reinforcement member 20 is affixed to the body 31 of the bulkhead 30 (see portion "B" in FIGS. 4 and 6). Therefore, the rear end of the reinforcement member 20 is coupled using the bulkhead 30, thereby enlarging the affixing area and enabling more uniform diffusion or distribution of side impact energy.

Figure 6:
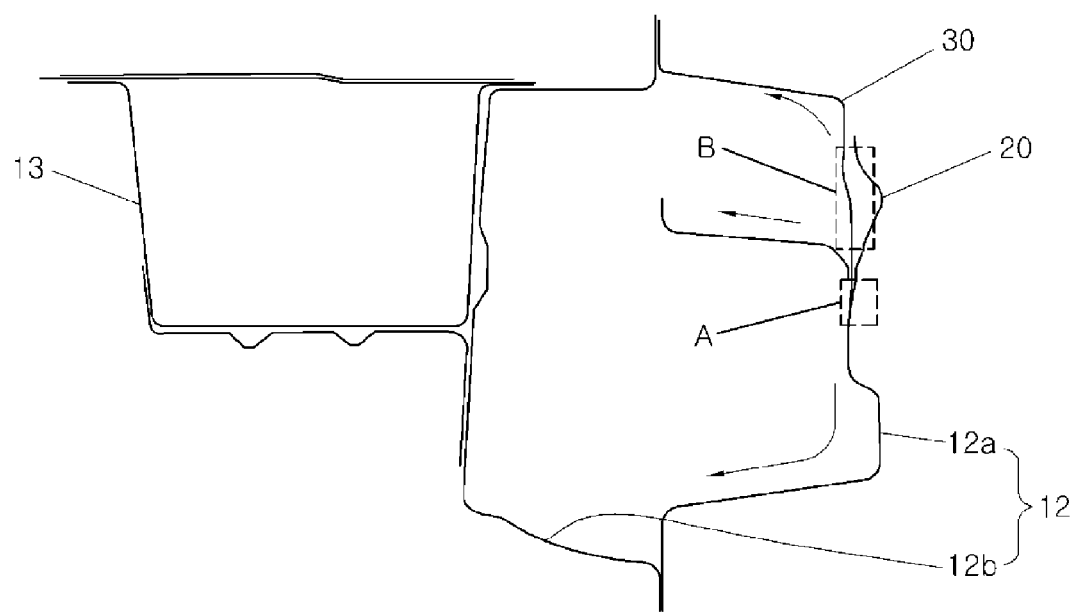
FIG. 6 is a cross-sectional view taken along line 6-6 of FIG. 4.

That is, as indicated by an arrow in FIG. 6, the vehicle has a structure such that the side impact energy transferred to the reinforcement member 20 is transferred to the side sill inner reinforce 12b via the bulkhead 30 or the side sill outer reinforce 12a, and is then transferred to a rear floor side member 13. Consequently, it may be possible to diffuse the impact energy and increase the coupling among these or other members.

Since a 2-door or 3-door type vehicle in accordance to the present application has a reinforcement member and the reinforcement member resists an impact generated at the time of a side collision of the vehicle, it may be possible to prevent the impact from being transferred to passengers residing at a rear seat of the vehicle, thereby reducing or eliminating potential injuries to the passengers that could be caused by the side collision.

For convenience in explanation and accurate definition in the appended claims, the terms "inner" or "outer", "frontward" or "rearward", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A 2-door or 3-door type vehicle, having enhanced resistance against a side impact, the 2-door or 3-door type vehicle comprising:
    a reinforcement member configured to be mounted at a side of the 2-door or 3-door type vehicle which is not equipped with a rear door, wherein the reinforcement member is inclined to have a high front end located frontward of the vehicle and connected to a center pillar and a low rear end located rearward of the vehicle and connected to a side sill;
    wherein the rear end is welded to a side sill outer reinforce of the side sill; and
    wherein the reinforcement member is affixed to a bulkhead which connects the side sill outer reinforce and a side sill inner reinforce.

2. The 2-door or 3-door type vehicle of claim 1, wherein the front end is welded to a center pillar outer reinforce of the center pillar.

3. The 2-door or 3-door type vehicle of claim 1, wherein:
    the bulkhead comprises a body and one or more lower flanges, wherein the one or more lower flanges extend from the body and are respectively affixed to side surfaces of the side sill outer reinforce; and
    the rear end of the reinforcement member is affixed to the body or the one or more lower flanges.

* * * * *